UNITED STATES PATENT OFFICE.

ERMENEGILDO STOPPANI, OF BOLOGNA, AND VITTORIO VOLPATO, OF MILAN, ITALY.

NEW SOLUBLE AND ASSIMILABLE PHOSPHATE MANURE AND PROCESS FOR MAKING IT.

1,267,473.             Specification of Letters Patent.     Patented May 28, 1918.

No Drawing.      Application filed October 5, 1916. Serial No. 123,920½.

*To all whom it may concern:*

Be it known that we, ERMENEGILDO STOPPANI and VITTORIO VOLPATO, subjects of the King of Italy, residing the first at Bologna and the second at Milan, Italy, have invented certain new and useful Improvements in New Soluble and Assimilable Phosphate Manure and Processes for Making It, of which the following is a specification.

Heretofore it has been the custom to use sulfuric acid in the manufacture of phosphatic manure.

The present invention has for its object to make a new phosphate manure without employing sulfuric acid and which will be readily assimilated by plants.

Having searched and made experiments on this matter, we have found that such a result can be obtained by mixing carbonates, or oxids of alkali, or carbonates or oxids of alkali and of alkali-earth metals, with ground phosphorites (that is to say natural phosphates), and by subjecting the mixture first to roasting in suitable furnaces and afterward to hydration by the addition of water.

The quantity of carbonates or oxids to be added to the phosphorites may be varied within wide limits. We have however found that when the contents of calcium phosphate in said phosphorites are about 60% the transformation of the insoluble earthy phosphates into a phosphate soluble in organic acids, and assimilable by plants, is more easily obtained and in greater quantity, if about 6% of carbonates or oxids are added thereto. More generally it can be said that the amount of reagents added is in proportion to the weight of phosphorite and that good results are obtained with a mixture containing about 10% of oxid or carbonate with reference to the pure calcium phosphate in the phosphorite.

We have also found that the temperature of the roasting furnaces can be raised without any inconvenience even above 600° C., provided that the melting point of the mixture is not attained.

Lastly we have found that, if the hydration is made by adding the water to the mixture when still hot on its leaving the furnace, a product is obtained which is more assimilable than that which could be obtained by making the hydration cold.

The partial or total substitution for the above mentioned alkaline carbonates or oxids of other salts—for instance sulfates—of the same bases can be also made without any inconvenience.

Having now particularly described and ascertained the nature of said invention, and in what manner the same is to be performed, we declare that what we claim is:—

1. A phosphatic fertilizer comprising a hydrated mixture of roasted phosphorite with a roasted alkaline oxygen salt, the proportion of such oxygen salt being approximately one tenth of the contents of calcium phosphate in the said phosphorite.

2. A phosphatic fertilizer comprising a hydrated mixture of roasted phosphorite containing about 60% of calcium phosphate with about 6% of roasted sodium carbonate.

3. The process of making a phosphatic fertilizer which consists in grinding phosphorite, grinding an alkaline oxygen salt, mixing them together, the proportion of said oxygen salt being approximately one tenth of the contents of calcium phosphate in said phosphorite, roasting the mixture, and hydrating said mixture, while still in a hot condition.

4. The process of making a phosphatic fertilizer which consists in grinding phosphorite containing about 60% of calcium phosphate, grinding sodium carbonate, mixing the phosphorite with about 6% of sodium carbonate, roasting the mixture to a temperature of about 600° C., and hydrating said mixture while still in a hot condition.

In testimony whereof we affix our signatures in presence of two witnesses.

DR. ERMENEGILDO STOPPANI.
VITTORIO VOLPATO.

Witnesses:
   LUG. REGERIDI TYNAGO,
   L. R. ARROYO.